(12) United States Patent
Takeda et al.

(10) Patent No.: US 11,540,225 B2
(45) Date of Patent: Dec. 27, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/332,852

(22) PCT Filed: Sep. 13, 2017

(86) PCT No.: PCT/JP2017/033022
§ 371 (c)(1),
(2) Date: Mar. 13, 2019

(87) PCT Pub. No.: WO2018/052017
PCT Pub. Date: Mar. 22, 2018

(65) Prior Publication Data
US 2019/0223107 A1 Jul. 18, 2019

(30) Foreign Application Priority Data
Sep. 14, 2016 (JP) .............................. JP2016-179895

(51) Int. Cl.
*H04W 52/14* (2009.01)
*H04W 72/12* (2009.01)
(Continued)

(52) U.S. Cl.
CPC ......... *H04W 52/146* (2013.01); *H04L 5/0082* (2013.01); *H04L 5/1469* (2013.01);
(Continued)

(58) Field of Classification Search
CPC .... H04L 5/0082; H04L 5/1469; H04W 52/14; H04W 52/146; H04W 72/04;
(Continued)

(56) References Cited

U.S. PATENT DOCUMENTS

2007/0287382 A1* 12/2007 Catreux-Erceg ...... H04W 52/56
455/501
2009/0180433 A1* 7/2009 Ahn ....................... H04W 52/54
370/329
(Continued)

FOREIGN PATENT DOCUMENTS

| JP | 2013530624 A | 7/2013 |
|----|--------------|--------|
| JP | 2015139101 A | 7/2015 |

(Continued)

OTHER PUBLICATIONS

International Search Report issued for PCT/JP2017/033022, dated Dec. 5, 2017 (5 pages).
(Continued)

*Primary Examiner* — Mehmood B. Khan
(74) *Attorney, Agent, or Firm* — Osha Bergman Watanabe & Burton LLP

(57) ABSTRACT

The present invention is designed to control transmission power properly even when communication is controlled based on shortened processing time. A user terminal communicates in a cell where a shortened TTI, having a transmission time interval (TTI) length shorter than 1 ms, is used, and/or in a cell where communication is controlled based on shortened processing time, which is shorter than in existing LTE systems, and this user terminal has a receiving section that receives a DL signal, a transmission section that transmits a UL signal in response to the DL signal, and a control section that controls transmission power of the UL signal based on a power control command contained in downlink control information transmitted in a predetermined trans-
(Continued)

TIMING OF DL HARQ/UL SCHEDULING
+
TRANSMISSION POWER CONTROL
BASED ON TPC COMMAND mission time interval in which the DL signal is transmitted, or in a transmission time interval located before the predetermined transmission time interval.

4 Claims, 12 Drawing Sheets

(51) Int. Cl.
  *H04W 72/04* (2009.01)
  *H04L 5/00* (2006.01)
  *H04L 5/14* (2006.01)
(52) U.S. Cl.
  CPC ........... *H04W 52/14* (2013.01); *H04W 72/04* (2013.01); *H04W 72/042* (2013.01); *H04W 72/0446* (2013.01); *H04W 72/12* (2013.01); *H04W 72/1263* (2013.01)
(58) Field of Classification Search
  CPC ........... H04W 72/042; H04W 72/0446; H04W 72/12; H04W 72/1263
  See application file for complete search history.

(56) References Cited

U.S. PATENT DOCUMENTS

| | | | | |
|---|---|---|---|---|
| 2011/0117952 | A1* | 5/2011 | Burstrom | H04W 52/44 455/522 |
| 2011/0274064 | A1 | 11/2011 | Luo et al. | |
| 2013/0114562 | A1* | 5/2013 | Seo | H04W 52/146 370/329 |
| 2014/0071864 | A1* | 3/2014 | Seo | H04L 1/1861 370/294 |
| 2014/0161003 | A1* | 6/2014 | Han | H04W 52/226 370/280 |
| 2014/0269454 | A1 | 9/2014 | Papasakellariou | |
| 2015/0124673 | A1* | 5/2015 | Ouchi | H04W 52/362 370/311 |
| 2015/0181539 | A1* | 6/2015 | Aiba | H04W 52/365 370/329 |
| 2015/0319700 | A1* | 11/2015 | Oteri | H04W 24/10 455/127.1 |
| 2016/0150487 | A1* | 5/2016 | Aiba | H04W 52/365 370/311 |
| 2017/0238287 | A1* | 8/2017 | Kusashima | H04W 28/04 370/280 |
| 2017/0273027 | A1* | 9/2017 | Kim | H04W 52/16 |
| 2017/0290008 | A1 | 10/2017 | Tooher et al. | |
| 2018/0041972 | A1* | 2/2018 | Delgado | H04W 52/283 |
| 2018/0338319 | A1* | 11/2018 | Kim | H04L 5/0053 |
| 2019/0373560 | A1* | 12/2019 | Ouchi | H04W 72/0446 |

FOREIGN PATENT DOCUMENTS

| | | |
|---|---|---|
| WO | 2016035717 A1 | 3/2016 |
| WO | 2016040290 A1 | 3/2016 |

OTHER PUBLICATIONS

Written Opinion issued for PCT/JP2017/033022, dated Dec. 5, 2017 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
NTT DoCoMo, Inc.; "sPDCCH for shortened TTI"; 3GPP TSG RAN WG1 Meeting #85 R1-165209; Nanjing, P.R. China, May 23-27, 2016 (5 pages).
Extended European Search Report issued in the counterpart European Patent Application No. 17850918.8, dated Mar. 31, 2020 (8 pages).
Samsung; "sDCI design for sTTI operations"; 3GPP TSG RAN WG1 Meeting #86, R1-166700; Gothenburg, Sweden, Aug. 22-26, 2020 (4 pages).
NTT DoCoMo, Inc.; "Uplink power control for sTTI"; 3GPP TSG RAN WG1 Meeting #89, R1-1708423; Hangzhou, P.R. China, May 15-19, 2017 (4 pages).
Office Action in counterpart European Patent Application No. 17 850 918.8 dated Sep. 11, 2020 (8 pages).
Office Action issued in Korean Application No. 10-2019-7007508, dated Mar. 3, 2021 (8 pages).
Office Action issued in Chinese Application No. 201780065560.7; dated Aug. 2, 2021 (15 pages).
Office Action issued in Japanese Application No. 2018-539746; dated Nov. 24, 2021 (8 pages).
Office Action issued in Chinese Application No. 201780065560.7 dated Feb. 25, 2022 (14 pages).

* cited by examiner

| TDD UL/DL CONFIGU-RATION | SUBFRAME NUMBER i | | | | | | | | | |
|---|---|---|---|---|---|---|---|---|---|---|
|  | 0 | 1 | 2 | 3 | 4 | 5 | 6 | 7 | 8 | 9 |
| 0 | - | - | 6 | 7 | 4 | - | - | 7 | 7 | 4 |
| 1 | - | - | 6 | 4 | - | - | - | 6 | 7 | - |
| 2 | - | - | 4 | - | - | - | - | 4 | 4 | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

FIG. 1

| UL/DL CONFIGU-RATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG. 2

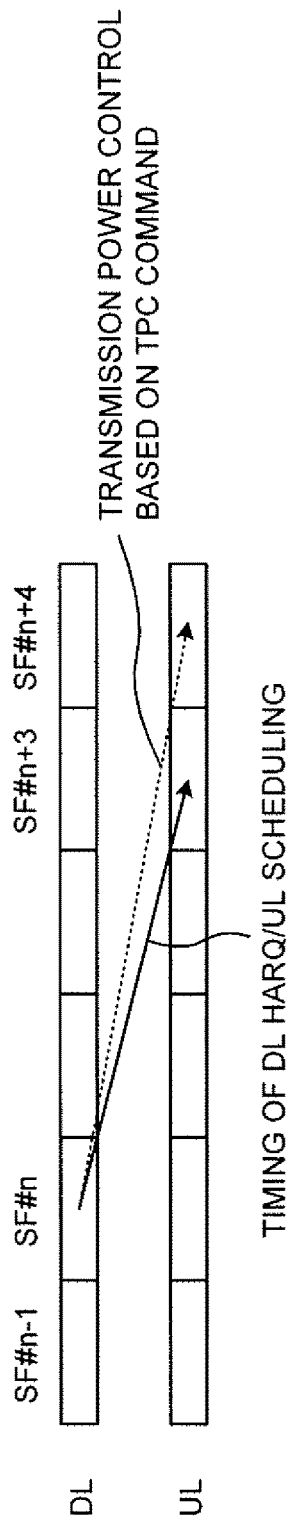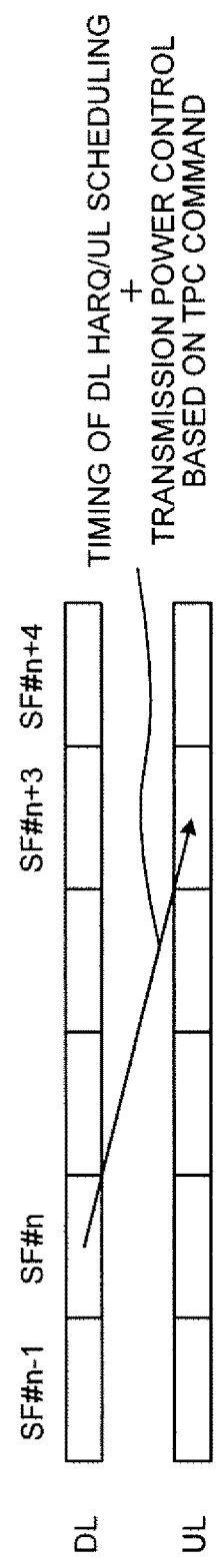

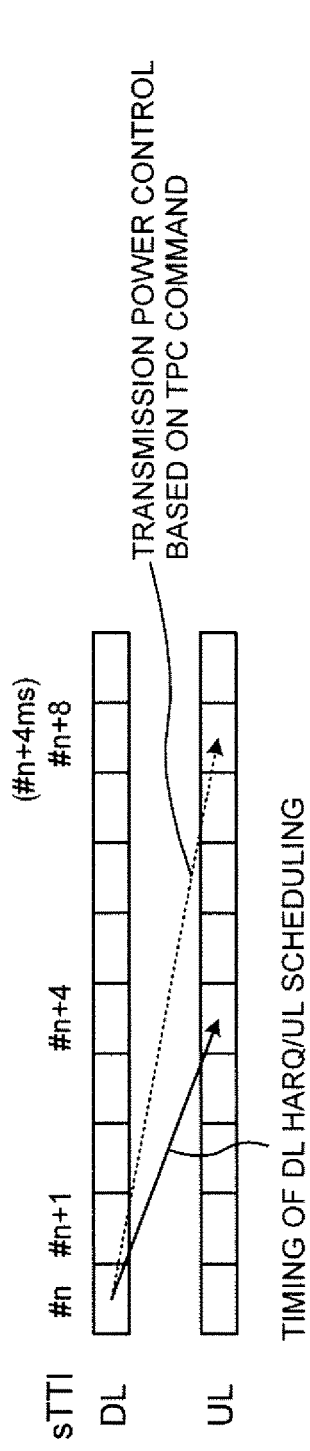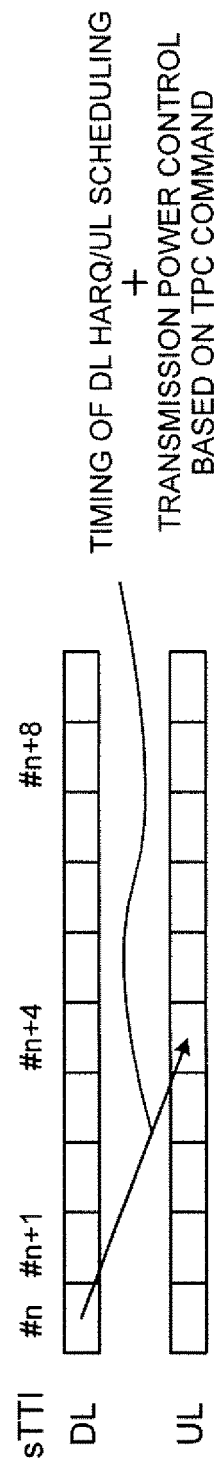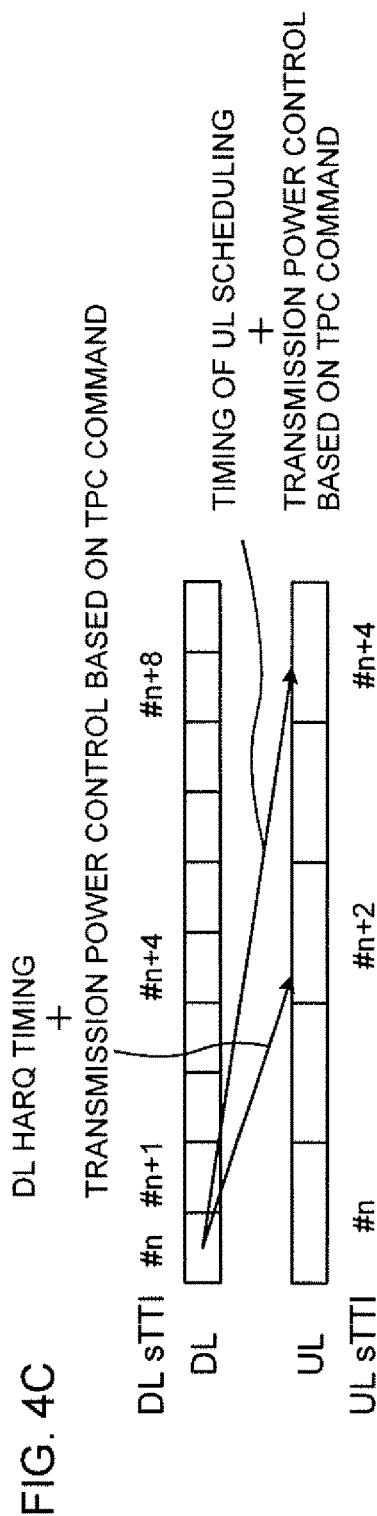

US 11,540,225 B2

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and/or the like).

In existing LTE systems (for example, LTE Rel. 8 to 13), downlink (DL) communication and/or uplink (UL) communication are carried out by using 1-ms transmission time intervals (TTIs) (also referred to as "subframes" and/or the like). This 1-ms TTI is the unit of time it takes to transmit one channel-encoded data packet, and is the processing unit in, for example, scheduling, link adaptation, retransmission control (HARQ (Hybrid Automatic Repeat reQuest)) and so on.

Also, in existing LTE systems (for example, LTE Rel. 8 to 13), frequency division duplex (FDD) and time division duplex (TDD) are supported as duplex schemes. FDD is a scheme to assign different frequencies to DL and UL, and is also referred to as "frame structure (FS) type 1 (FS 1)." TDD is a scheme to switch between DL and UL over time in the same frequency, and is also referred to as "frame structure type 2 (FS 2)." In TDD, communication is carried out based on UL/DL configurations, which define the formats of UL subframes and DL subframes in radio frames.

Also, in existing LTE systems (for example, LTE Rel. 8 to 13), the timing for transmitting retransmission control information (including, for example, ACK (ACKnowledgement) or NACK (Negative ACK), A/N, HARQ-ACK and so on, and these hereinafter will be collectively referred to as "A/N") in response to a DL shared channel (for example, a physical downlink shared channel, which hereinafter will be referred to as "PDSCH") (and this timing will be hereinafter also referred to as "DL HARQ timing" and so on) is controlled by taking into account the signal processing time and the like in user terminals and/or radio base stations, and on assumption that the reference value for the timing for transmission is fixed at 4 ms.

For example, in FDD in existing LTE systems (for example, LTE Rel. 8 to 13), when a PDSCH is received in subframe #n, an A/N is transmitted (as feedback) in response to this PDSCH in subframe #n+4, on assumption that the time it takes for a user terminal to process the PDSCH and/or others is 4 ms. Also, when, in TDD, a PDSCH is received in DL subframe #n, an A/N in response to this PDSCH is transmitted in subframe #n+4 or a later UL subframe on assumption that the processing time of the PDSCH and/or others in the user terminal takes 4 ms.

Also, in existing LTE systems (for example, LTE Rel. 8 to 13), the timing for transmitting A/Ns in response to an uplink shared channel (for example, a physical uplink shared channel, which hereinafter will be referred to as "PDSCH") (this timing will be also referred to as "UL HARQ timing" and/and so on) is also controlled by using 4 ms as a fixed reference value for the timing for signal transmission in user terminals and/or radio base stations.

CITATION LIST

Non-Patent Literature

Non-Patent Literature 1: 3GPP TS 36.300 Rel. 8 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, LTE Rel. 14, 15 and later versions, 5G, NR and so forth) are required to reduce latency (also referred to as "latency reduction") in order to provide communication services having strict requirements on latency, such as URLLC. Latency as used herein collectively refers to the latency in the propagation time of signals (propagation delay) and the latency in the processing time of signals (processing delay).

As for the method of reducing these latencies, it may be possible to shorten the very processing unit for use for communication control (for example, scheduling and/or retransmission control) by introducing a new TTI (short TTI) that is shorter than a 1-ms subframe (TTI).

Meanwhile, even when 1-ms subframes (1-ms TTIs) are kept as processing units for controlling communication, it is still desirable to reduce latency. When keeping 1-ms subframes as processing units for communication control, it may be possible to control transmission and/or receipt of signals and so forth based on short processing time, where the reference value for the timing for transmitting/receiving signals is configured short, in order to reduce latency.

Now, in existing LTE systems, the transmission power of uplink signals is controlled based on transmission power control (TPC) commands and/or others that are included in downlink control information. In this case, as mentioned earlier, how to use TPC commands when shortened processing time by means of 1-ms TTIs or short TTIs (shortened TTIs) is introduced is not specified yet, and therefore how to control transmission power is the problem.

The present invention has been made in view of the above, and it is therefore an object of the present invention to provide a user terminal and a radio communication method, whereby transmission power can be controlled properly even when communication is controlled based on shortened processing time.

Solution to Problem

According to one aspect of the present invention, a user terminal communicates in a cell where a shortened TTI, having a transmission time interval (TTI) length shorter than 1 ms, is used, and/or in a cell where communication is controlled based on shortened processing time, which is shorter than in existing LTE systems, and this user terminal has a receiving section that receives a DL signal, a transmission section that transmits a UL signal in response to the DL signal, and a control section that controls transmission power of the UL signal based on a power control command contained in downlink control information transmitted in a predetermined transmission time interval in which the DL signal is transmitted, or in a transmission time interval located before the predetermined transmission time interval.

Advantageous Effects of Invention

According to the present invention, transmission power can be controlled properly even when communication is controlled based on shortened processing time.

BRIEF DESCRIPTION OF DRAWINGS

FIG. 1 is a diagram to show a table, in which $k_{PUSCH}$ to be applied to PUSCH transmission is defined;

FIG. 2 is a diagram to show a table, in which M and $k_m$ to be applied to PUCCH transmission are defined;

FIGS. 3A to 3C are diagrams to show examples of methods for applying TPC commands;

FIGS. 4A to 4C are diagrams to show other examples of methods for applying TPC commands;

DESCRIPTION OF EMBODIMENTS

Figure 5:
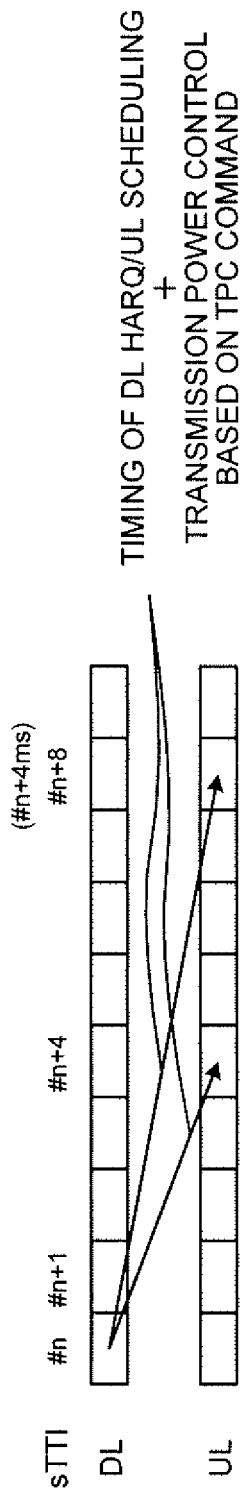
FIG. 5 is a diagram to show another example of the method for applying TPC commands.

Existing LTE systems (LTE Rel. 8 to 13) support hybrid automatic repeat request (HARQ) in order to prevent degradation of communication quality between user terminals (UE (User Equipment)) and radio base stations (eNode B (eNode B)).

In the DL of existing LTE systems, a user terminal transmits a delivery acknowledgment signal (also referred to as a "retransmission control signal," an "HARQ-ACK," an "ACK/NACK," an "A/N," and so on) in response to a DL signal (for example, a PDSCH) based on the result of the receipt of this PDSCH. The user terminal can transmit the A/N by using an uplink control channel (for example, a PUCCH) and/or an uplink shared channel (for example, a PUSCH). The radio base station controls the transmission of the PDSCH (including initial transmission and/or retransmission) based on the A/N from the user terminal. Also, in the UL of existing LTE systems, the user terminal transmits uplink data (for example, a PUSCH), scheduled by UL grants transmitted from the radio base station.

In existing LTE systems, A/N transmission, UL data transmission, and so on are controlled a certain period of time after subframes in which DL signals are transmitted/received, based on predefined transmission timings. For example, in FDD, a user terminal transmits an A/N in response to a PDSCH in the subframe that is located 4 ms after the subframe in which the PDSCH was received. Also, the user terminal transmits a PUSCH in response to a UL grant in the subframe that is located 4 ms after the subframe in which the UL grant was received.

Now, future radio communication systems (5G/NR) are expected to reduce latency in communication, and studies are in progress to shorten the processing time for transmitting/receiving signals compared to existing LTE systems. As for the method of enabling reduction of processing time, communication may be controlled in subframe units (1-ms TTIs) as in existing LTE systems, and, apart from this, setting up shorter processing time than the processing time in existing LTE systems.

Here, the processing time (for example, the processing time in LTE Rel. 8 to 13) in existing LTE systems may be referred to as "normal processing time." Processing time shorter than the normal processing time may be referred to as "shortened processing time." A user terminal where shortened processing time is configured controls transmitting/receiving processes (for example, encoding) for predetermined signals so that these signals are transmitted/received at earlier timings than the transmission/receiving timings defined in existing LTE systems. Shortened processing time may be configured for specific processes (may be configured in various units, such as per signal, per process, etc.), or configured in all processes.

For example, if shortened processing time is configured by using TTIs of 1 ms (subframes), a user terminal controls certain operations to be processed at earlier timings than in existing systems, by using existing channels (PDCCH, PDSCH, PUSCH, PUCCH and/or other channels).

When shortened processing time is configured in UE, the following times in existing LTE systems are likely to become shorter than a certain length of time (for example, 4 ms): (1) the time it takes, after DL data is received, until an HARQ-ACK is transmitted in response, and/or the time it takes, after an HARQ-ACK is transmitted, until DL data is received in response; and (2) the time it takes, after a UL grant is received, until UL data is transmitted in response, and/or the time it takes, after UL data is transmitted, until a UL grant is received in response.

Note that shortened processing time may be defined in the specification in advance, or reported to (configured in, indicated to, etc.) UE by using higher layer signaling (for example, radio resource control (RRC) signaling, broadcast information (including, for example, the master information block (MIB), system information blocks (SIBs), etc.), medium access control (MAC) signaling and so forth), physical layer signaling (for example, downlink control information (DCI)) and/or other signals, or by combining these.

Also, as for the method of enabling latency reduction in communication, it may be possible to control transmission and/or receipt of signals by introducing shortened TTIs (short TTIs), which are shorter in duration than subframes (I ms) in existing LTE systems. Here, a TTI having a time duration of 1 ms like existing subframes (for example, TTIs in LTE Rel. 8 to 13) may be referred to as a "normal TTI (nTTI)." A TTI that is shorter than an nTTI may be referred to as a "shortened TTI (sTTI)."

When sTTIs are used, the time margin for processing (for example, encoding, decoding, etc.) in UE and/or eNB grows, so that the processing latency can be reduced. Also, when sTTIs are used, it is possible to increase the number of UEs that can be accommodated per unit time (for example, 1 ms).

UE where sTTIs are configured will use channels of shorter time units than existing data and control channels. For example, a shortened downlink control channel (sPDCCH (shortened PDCCH)), a shortened downlink data channel (sPDSCH (shortened PDSCH)), a shortened uplink control channel (sPUCCH (shortened PUCCH)), a shortened uplink data channel (sPUSCH (shortened PUSCH)), and so forth are under study, as shortened channels to be transmitted and/or received in sTTIs. The above-noted shortened processing time of (1) and/or (2) may be configured even for UEs where sTTIs are configured.

When shortened TTIs are configured, shortened TTIs in FDD and in TDD, and/or shortened TTIs in the downlink and in the uplink may be configured differently (independently of each other). For example, in FDD, it is possible to configure, at least, the TTI length of shortened TTIs in the uplink greater than the TTI length of shortened TTIs in the downlink.

To illustrate an example, the length of an uplink sTTI to use to transmit sPUCCH (for example, A/N) can be configured to be the same as or longer than a downlink sTTI to use to transmit sPDSCH (for example, DL data). Also, the length of an uplink sTTI to use to transmit sPUSCH (for example, UL data) can be configured to be the same as or longer than a downlink sTTI to use to transmit sPDCCH (for example, UL grant). Also, in one subframe, the TTI length of sPUSCH and the TTI length of sPUCCH can be made the same length.

Also, in TDD, the TTI length of sTTIs for use in the DL and in the UL may be configured to a predetermined value. The predetermined value may be, for example, one slot (half of a subframe in existing systems). Note that, in the present embodiment, the TTI length that can be used for sTTIs is not limited to these.

Now, in existing LTE systems, the transmission power of uplink signals is controlled based on transmission power control (TPC) commands and/or others that are included in downlink control information. TPC commands for controlling the transmission power of an uplink shared channel (PUSCH) are contained in a downlink control channel (PDCCH/EPDCCH) for transmitting DCI format 0/4, a downlink control channel (MPDCCH) for transmitting DCI format 6-0A, and a downlink control channel (PDCCH/MPDCCH) for transmitting DCI format 3/3A. The CRC parity bits for DCI format 3/3A are scrambled by RNTIs for TPC (TPC-PUSCH-RNTIs).

When a user terminal transmits a PUSCH in a subframe (SF #i), the user terminal controls the transmission power of this PUCCH based on the TPC command contained in the subframe (SF #i-$k_{PUSCH}$) located a predetermined value (for example, $k_{PUSCH}$) before. In the event of FDD, a user terminal uses $k_{PUSCH}$=4. In the event of TDD, the user terminals uses $k_{PUSCH}$ that is defined per UL subframe based on UL/DL configurations (see FIG. 1).

FIG. 1 shows an example of a table, in which $k_{PUSCH}$ to be applied to PUCCH transmission in each UL subframe in TDD is defined per UL/DL configuration. For example, in the event a user terminal transmits PUSCH in SF #2 of UL/DL configuration #0, the user terminal controls the transmission power of the PUSCH based on the TPC command transmitted in the DL subframe (SF #6) located $k_{PUSCH}$ (here, six subframes) before.

TPC commands for controlling the transmission power of an uplink control channel (PUCCH) are contained in a downlink control channel (PDCCH/EPDCCH) for transmitting DCI format 1A/1B/1D/1/2A/2/2B/2C/2D, a downlink control channel (MPDCCH) for transmitting DCI format 6-1A, and a downlink control channel (PDCCH/MPDCCH) for transmitting DCI format 3/3A. The CRC parity bits for DCI format 3/3A are scrambled by RNTIs for TPC (TPC-PUCCH-RNTIs).

When the user terminal transmits a PUCCH in a subframe (SF #i), the user terminal controls the transmission power of this PUCCH based on following equation 1, according to the TPC command contained in the subframe (SF #i-$k_m$) that is located a predetermined value (for example, $k_m$) before.

$$g(i)=g(i-1)+\Sigma_{m=0}^{M-1}\delta_{PUCCH}(i-k_m) \quad \text{(Equation 1)}$$

In equation 1, g(i) is the current state of PUCCH power control adjustment (or the "current PUCCH power control adjustment state"), and g(0) is the first value after reset. M is the number of subframes corresponding to the TPC command.

In the event of FDD or FDD-TDD CA (in the event the primary cell uses FDD), the transmission power of the PUCCH is controlled based on M=1 and $k_0$=4. In the event of TDD, M and $k_m$ assume values that are defined per UL subframe based on UL/DL configurations (see FIG. 2).

FIG. 2 shows an example of a table, in which M and $k_m$ to be applied to PUCCH transmission in each UL subframe in TDD are defined per UL/DL configuration. For example, when a user terminal transmits a PUCCH in SF #2 of UL/DL configuration #1, the user terminal controls the transmission power of the PUCCH based on above equation 1, where M=2, and $k_m$=7 and 6 are given.

Note that, if there are multiple Ms (that is, in the event of M>1), the user terminal can control PUCCH transmission power by using TPC commands transmitted in multiple DL subframes (for example, Rel. 8). Alternatively, when there are a number of Ms (that is, in the event of M>1), the user terminal can control PUCCH transmission power by using the TPC command transmitted in one DL subframe (for example, the earliest DL subframe in the time direction), and use the bit values of other TPC command for other purposes (for example, to specify PUCCH resources) and so on (Rel. 10 or later versions).

As described above, in existing LTE systems, the transmission power of uplink signals is determined based on transmission power control (TPC) commands contained in downlink control information transmitted in predetermined subframes and/or the like. However, as mentioned earlier, how to use TPC commands when shortened processing time by means of 1-ms TTIs or short TTIs (shortened TTIs) is introduced is not specified yet. Therefore, how to control uplink transmission power when shortened processing time is configured is the problem. For example, when short TTIs are used, how to apply TPC commands to control the transmission power of sPUSCH and sPUCCH, which are transmitted in short TTIs, is the problem.

So, assuming that shortened processing time is introduced, the present inventors have come up with the idea of controlling the transmission power of UL signals by using transmission power commands contained in downlink control information at timings that are based on existing systems and/or at shorter timings than those of existing systems. To be more specific, assuming that shortened processing time is configured, the present inventors have come up with (1) a configuration to control the transmission power of UL signals by using transmission power commands contained in downlink control information at timings that are based on existing systems, (2) a configuration to control the transmission power of UL signals by using the above transmission power commands at shortened timings, and (3) a configuration to control the transmission power of UL signals by using the above transmission power commands at the same timings as the timings of HARQ feedback and/or UL scheduling.

Now, embodiments of the present invention will be described below in detail. In the following embodiments, a user terminal receives a DL shared channel (which is also referred to as a "DL data channel," "DL data," and so on, and which hereinafter will be referred to as "PDSCH") and controls the transmission of delivery acknowledgment signals in response to this PDSCH. In addition, the user terminal receives UL transmission commands (also referred to as "UL grants") for scheduling UL transmission, and controls the transmission of UL signals (for example, UL data) based on these UL transmission commands. Delivery acknowledgment signals can be transmitted in the PUCCH and/or the PUSCH, and UL data can be transmitted in the PUSCH.

Also, the user terminal controls the timing for transmission based on a reference value (for example, k) that is configured for processing time (k=4 in existing systems). This reference value may be the processing time, a parameter related to the processing time, and/or the like. Furthermore, the herein-contained embodiments can be applied to FDD and/or TDD. Although the following description will illustrate examples based on FDD, TDD is also applicable. Also, although, in the following description, an uplink control channel (PUCCH, sPUCCH, etc.), an uplink shared channel (PUSCH, sPUSCH, etc.) and so forth will be described as examples of UL signals subject to transmission power control, the present embodiment is by no means limited to these. Other UL signals (for example, reference signals such as SRS) are equally applicable as well.

First Example

With a first example of the present invention, an example of controlling transmission power by using TPC commands contained in downlink control information for scheduling DL transmission (DL DCI) and/or downlink control information for scheduling UL signals (UL DCI) will be described below. Also, with the first example, a case will be described in which the reference value (k) for shortened processing time is 3 ms, but the present embodiment is by no means limited to this, and k may be 2 ms or 1 ms, or other values may be used.

<Setting of Shortened Processing Time when 1-Ms TTI is Used>

When shortened processing time (for example, reference value (k)) is configured, a user terminal controls the time it takes, after DL data is received, until an HARQ-ACK is transmitted in response, and/or the time it takes, after an HARQ-ACK is transmitted, until DL data is received in response, based on a reference value (k). Also, the user terminal controls the time it takes, after a UL grant is received, until UL data is transmitted in response, and/or the time it takes, after UL data is transmitted, until a UL grant is received in response, based on the reference value (k).

For example, when, in FDD, k=3 is configured, the user terminal controls an HARQ-ACK in response to DL data received in subframe i, to be transmitted in subframe i+3. Also, the user terminal can control receipt on assumption that DL data in response to an HARQ-ACK transmitted as feedback in subframe i will be transmitted in subframe i+3.

The user terminal controls UL data in response to a UL transmission command received in subframe i to be transmitted in subframe i+3. Also, the user terminal can control receipt on assumption that a UL grant (for example, a retransmission command) in response to UL data transmitted in subframe i will be transmitted in subframe i+3.

Also, in TDD, the user terminal can control the processing time of, for example, HARQ-ACK transmission, UL data transmission and so forth, based on tables that are configured based on the values the reference values (k) is configured in.

When shortened processing time is configured, the user terminal uses power control commands contained in downlink control information (UE-specific control information) to control the transmission power of UL signals located a predetermined timing later. Now, (1) a configuration to use power control commands contained in downlink control information at timings based on existing systems, (2) a configuration to use the above power control commands at timings based on shortened processing time, and (3) a configuration to use the above power control commands at the same timings as the timings of HARQ feedback and/or UL scheduling, will be explained below.

(1) Use of Timings of Existing Systems

FIG. 3A shows a case where power control commands contained in downlink control information are used to control the transmission power of the PUCCH and/or the PUSCH at existing systems' timings. A user terminal transmits an HARQ-ACK in response to the DL signal (for example, PDSCH) transmitted in SF #n, as feedback, in SF #n+3, which is located k ms later (here, k=3). In addition, the user terminal transmits uplink data (for example, PUSCH) in response to the UL transmission command contained in the downlink control information (DCI) transmitted in SF #n, as feedback, in SF #n+3, which is located 3 ms later.

Meanwhile, the user terminal uses the TPC command contained in the downlink control information transmitted in this SF #n to control the UL transmission power in SF #n+4, which is located a timing after SF #n, where this timing is defined based on existing systems (k=4 in FDD). When DL DCI to schedule a DL signal is transmitted in SF #n, the user terminal controls the transmission power of the PUCCH in SF #n+4 based on the TPC command contained in this DL DCI. Also, when UL DCI to schedule a UL signal is transmitted in SF #n, the user terminal controls the transmission power of the PUSCH in SF #n+4 based on the TPC command contained in this UL DCI.

Note that the user terminal can control the transmission power of the PUCCH and/or the PUSCH to be transmitted as feedback in SF #n+3 based on TPC commands contained in downlink control information in before SF #n (SF #n-1 or earlier SFs). For example, when DL DCI to schedule a DL signal is transmitted in SF #n-1, the user terminal controls the transmission power of the PUCCH in SF #n+3 based on the TPC command contained in this DL DCI. Also, when UL DCI to schedule a UL signal is transmitted in SF #n-1, the user terminal controls the transmission power of the PUSCH in SF #n+3 based on the TPC command contained in this UL DCI.

In this manner, referring to FIG. 3A, an UL signal (SF #n+3) in response to a DL signal received in SF #n and a TPC command to use to control the transmission power of this UL signal can be included and transmitted in a DL signal (SF #n-1 or earlier) that is not associated with this UL signal. In this way, by applying TPC commands to UL signals based on existing systems' timings, even when shortened processing time is configured, it is possible to reserve the time required to control transmission power and/or to calculate power headroom report (PHR) information related to transmission power, in the user terminal. By this means, it is possible to reduce the increase of the load incurred by transmission power control in the user terminal, so that it is possible to configure communication based on shortened processing time, even when the user terminal has low capabilities regarding transmission power control.

(2) Use of Timings Based on Shortened Processing Time

FIG. 3B shows a case where power control commands contained in downlink control information are used to control the transmission power of the PUCCH and/or the PUSCH at timings based on shortened processing time. A user terminal transmits an HARQ-ACK in response to a DL signal (for example, PDSCH) transmitted in SF #n, as feedback, in SF #n+3, which is located k ms later (here, k=3). In addition, the user terminal transmits uplink data (for example, PUSCH) in response to the UL transmission command contained in the downlink control information (DCI) transmitted in SF #n, as feedback, in SF #n+3, which is located 3 ms later.

Also, the user terminal uses the TPC command contained in the downlink control information transmitted in this SF #n to control the UL transmission power in SF #n+3, which is located a timing after SF #n, where this timing is defined based on shortened processing time (here, k=3). When DL DCI to schedule a DL signal is transmitted in SF #n, the user terminal controls the transmission power of the PUCCH in SF #n+3 based on the TPC command contained in this DL DCI. Also, when UL DCI to schedule a UL signal is transmitted in SF #n, the user terminal controls the transmission power of the PUSCH in SF #n+3 based on the TPC command contained in this UL DCI.

In this way, referring to FIG. 3B, an UL signal (SF #n+3) in response to a DL signal received in SF #n and a TPC command to use to control the transmission power of this UL signal can be included and transmitted in a DL signal (SF #n) that is associated with this UL signal. In this way, when shortened processing time is configured, TPC commands are applied to UL signal transmission power control at the same timing as this shortened processing time, so that fast transmission power control to suit the shortened processing time can be implemented. By this means, when a UL signal is transmitted based on shortened processing time, unlike in existing systems, it is possible to control the transmission power of this UL signal by using the latest (closest) transmission power control command.

In this case, PHR can be calculated and reported based on the transmission power of SF #n+3. By this means, the radio base station can learn accurate PHR and control transmission power properly. Alternatively, the PHR (virtual PHR) when there is no transmission in SF #n+3 may be calculated and reported for PHR. In this case, the user terminal can skip part of the processes that are necessary to calculate PHR, so that it is possible to reduce the user terminal's processing load.

(3) Use of Timings of A/N Feedback and/or UL Scheduling

FIG. 3C shows a case where the transmission power of the PUCCH and/or the PUSCH is controlled by using power control commands contained in downlink control information, at the timing of DL HARQ feedback and/or at the timing of UL scheduling.

When shortened processing time is configured, different processing times (values of k) may be configured in user terminals. For example, there may be cases where one of SF #n+3 (k=3) and SF #n+4 (k=4), switched, is configured for the timing for transmitting HARQ-ACK feedback (or for transmitting UL data) in response to a DL signal transmitted in SF #n.

In this case, the user terminal applies the TPC command contained in the downlink control information transmitted in this SF #n to the uplink transmission power at the same timing as the timing for HARQ-ACK feedback (or for transmitting UL data). For example, when the timing for HARQ-ACK feedback (or for transmitting UL data) is k=3, the user terminal controls the UL transmission power in SF #n+3 based on the TPC command contained in the downlink control information transmitted in SF #n. Meanwhile, when the timing for HARQ-ACK feedback (or for transmitting UL data) is k=4, the user terminal controls the UL transmission power in SF #5 based on the TPC command contained in the downlink control information transmitted in SF #n+4.

In this way, by controlling the timing to use TPC commands based on the timing of DL HARQ feedback and/or the timing of UL scheduling configured in the user terminal, even if the radio base station commands to switch the value of k, it is still possible to control the user terminal so that TPC commands are reflected on transmission power at timings desired by the radio base station.

<Setting of Shortened Processing Time when Shortened TTI is Used>

When shortened processing time by means of shortened sTTIs is configured, the user terminal controls, based on shortened TTIs (sTTIs), the time it takes, after DL data is received, until an HARQ-ACK is transmitted in response, and/or the time it takes, after an HARQ-ACK is transmitted, until DL data is received in response. Also, the user terminal controls, based on shortened TTIs (sTTIs), the time it takes, after a UL grant is received, until UL data is transmitted in response, and/or the time it takes, after UL data is transmitted, until a UL grant is received in response.

For example, in FDD, if sTTIs that have a shorter TTI length than 1 ms (for example, having a TTI length of 0.5 ms (one slot)) are configured, the user terminal controls an HARQ-ACK in response to the DL data received in sTTI #n to be transmitted in a transmission time interval (sTTI, subframe, etc.) that corresponds to sTTI #n+4. Also, the user terminal can control receipt on assumption that DL data in response to the HARQ-ACK transmitted as feedback in sTTI #n will be transmitted in a transmission time interval (sTTI, subframe, etc.) corresponding to sTTI #n+4.

Also, the user terminal may control UL data in response to the UL transmission command received in sTTI #n to be transmitted in a transmission time interval (sTTI, subframe, etc.) corresponding to sTTI #n+4. The user terminal can control receipt on assumption that an UL grant (for example, retransmission command) in response to the UL data transmitted in sTTI #n will be transmitted in a transmission time interval (sTTI, subframe, etc.) corresponding to sTTI #n+4.

Also, in TDD, the user terminal can control the processing time of, for example, HARQ-ACK transmission, UL data transmission and so forth, based on tables that are configured individually depending on what sTTIs are configured.

When shortened processing time by means of sTTIs is configured, the user terminal uses power control commands contained in downlink control information (UE-specific control information) to control the transmission power of UL signals located a predetermined timing later. Now, (1) a configuration to use power control commands contained in downlink control information at timings based on existing systems, (2) a configuration to use the above power control commands at timings based on shortened processing time, and (3) a configuration to use the above power control commands at the same timings as the timings of HARQ feedback and/or UL scheduling, will be explained below.

(1) Use of Timings of Existing Systems

FIG. 4A shows a case where power control commands contained in downlink control information are used to control the transmission power of the PUCCH and/or the PUSCH at existing systems' timings. A user terminal transmits an HARQ-ACK in response to a DL signal (for example, PDSCH) transmitted in sTTI #n, as feedback, in sTTI #n+4, which is located four sTTIs later. In addition, the user terminal transmits uplink data (for example, PUSCH) in response to the UL transmission command contained in the downlink control information (DCI) transmitted in this sTTI #n, as feedback, in sTTI #n+4, which is located four sTTIs later.

Meanwhile, the user terminal uses the TPC command contained in the downlink control information transmitted in this sTTI #n to control the UL transmission power in sTTI #n+8, which is located a timing after sTTI #n, where this timing is defined based on existing systems (k=4 ms in FDD). When DL DCI to schedule a DL signal is transmitted in sTTI #n, the user terminal controls the transmission power of the PUCCH in sTTI #n+8 based on the TPC command contained in this DL DCI. Also, when UL DCI to schedule a UL signal is transmitted in sTTI #n, the user terminal controls the transmission power of PUSCH in sTTI #n+8 based on the TPC command contained in this UL DCI.

Note that the user terminal can control the transmission power of the PUCCH and/or PUSCH to be transmitted as feedback in sTTI #n+4 based on TPC commands contained in downlink control information before sTTI #n (sTTI #n−4 or earlier sTTIs). For example, when DL DCI to schedule a DL signal is transmitted in sTTI #n−4, the user terminal controls the transmission power of the PUCCH in sTTI #n+4 based on the TPC command contained in this DL DCI. Also, when UL DCI to schedule a UL signal is transmitted in sTTI #n−4, the user terminal controls the transmission power of the PUSCH in sTTI #n+4 based on the TPC command contained in this UL DCI.

In this way, referring to FIG. 4A, an UL signal (sTTI #n+4) in response to a DL signal received in sTTI #n and a TPC command to use to control the transmission power of this UL signal can be included and transmitted in a DL signal (sTTI #n−4 or earlier) that is not associated with this UL signal. In this way, by applying TPC commands to UL signals based on existing systems' timings, even when shortened processing time is configured, it is possible to reserve the time required to control transmission power and/or to calculate power headroom report (PHR) information related to transmission power, in the user terminal. By this means, it is possible to reduce the increase of the load incurred by transmission power control in the user terminal, so that it is possible to configure communication based on shortened processing time, even when the user terminal has low capabilities regarding transmission power control.

(2) Use of Timings Based on Shortened Processing Time

FIG. 4B shows a case where power control commands contained in downlink control information are used to control the transmission power of the PUCCH and/or the PUSCH at timings based on shortened processing time. A user terminal transmits an HARQ-ACK in response to a DL signal (for example, PDSCH) transmitted in sTTI #n, as feedback, in sTTI #n+4, which is located four sTTIs later. In addition, the user terminal transmits uplink data (for example, PUSCH) in response to the UL transmission command contained in the downlink control information (DCI) transmitted in this sTTI #n, as feedback, in sTTI #n+4, which is located four sTTIs later.

Also, the user terminal uses the TPC command contained in the downlink control information transmitted in this sTTI n# to control the UL transmission power in sTTI #n+4, which is located a timing after sTTI #n, where this timing is defined based on shortened processing time (here, four sTTIs later). When DL DCI to schedule a DL signal is transmitted in sTTI #n, the user terminal controls the transmission power of the PUCCH in sTTI #n+4 based on the TPC command contained in this DL DCI. Also, when UL DCI to schedule a UL signal is transmitted in sTTI #n, the user terminal controls the transmission power of the PUSCH in sTTI #n+4 based on the TPC command contained in this UL DCI.

In this way, referring to FIG. 4B, a UL signal (sTTI #n+4) in response to a DL signal received in sTTI #n and a TPC command to use to control the transmission power of this UL signal can be included and transmitted in a DL signal (sTTI #n) that is associated with this UL signal. In this way, when shortened processing time is configured, TPC commands are applied to UL signal transmission power control at the same timing as this shortened processing time, so that fast transmission power control to suit the shortened processing time can be implemented. By this means, when a UL signal is transmitted based on shortened processing time, unlike in existing systems, it is possible to control the transmission power of this UL signal by using the latest (closest) transmission power control command.

Note that, although FIG. 4B shows a case where the same TTI length is configured in the DL and the UL, different TTI lengths may be configured for the DL and the UL. In this case, a transmission timing that is based on the TTI length of DL sTTIs and corresponding TPC commands can be applied to the timing for DL HARQ feedback, and a transmission timing that is based on the TTI length of UL sTTIs and corresponding TPC commands can be applied to the timing for UL scheduling (see FIG. 4C).

FIG. 4C shows a case where the TTI length of DL sTTIs is configured to be shorter than the TTI length of UL sTTIs. In this case, a user terminal can transmit an HARQ-ACK (for example, sPUCCH) in response to a DL signal (for example, sPDSCH) transmitted in DL sTTI #n, as feedback, in the UL sTTI that is located four sTTIs later in the DL (here, in UL sTTI #n+2). This is because a DL signal contained in a DL sTTI has a relatively short time duration and a small data size, so that the data can be demodulated with low latency. Also, the user terminal uses the TPC command contained in the downlink control information transmitted in DL sTTI #n to transmit the sPUCCH in UL sTTI #n+2.

Also, the user terminal can transmit uplink data (for example, sPUSCH) in response to a UL transmission command (for example, sPDCCH) transmitted in DL sTTI #n in the UL sTTI that is located four sTTIs later in the UL (here, UL sTTI #n+4). This is because a UL signal contained in a UL sTTI has a relatively long time duration and a large data size, so that it takes a long processing time to generate data. Also, the user terminal uses the TPC command contained in the downlink control information transmitted in DL sTTI #n to transmit the sPUCCH in UL sTTI #n+4.

In this way, when different TTI lengths are configured in the UL and the DL, the same TPC command can be applied to uplink signals that are transmitted at different timings, based on TTI lengths, so that DL signals (and DL HARQ) or the UL signal scheduled by the DCI and the TPC application timing can be made the same. Thus, it is possible to simultaneously execute the scheduler control in the radio base station and the transmission power control for the terminal, so that it is possible to reduce the processing load caused by the control in the radio base station.

(3) Use of Timings of A/N Feedback and/or UL Scheduling

FIG. 5 shows a case where the transmission power of the PUCCH and/or the PUSCH is controlled by using power control commands contained in downlink control information, at the timing of DL HARQ feedback and/or at the timing of UL scheduling.

When shortened processing time by means of sTTIs is configured, different feedback timings may be configured in user terminals. For example, there may be cases where one of four sTTIs (for example, sTTI #n+4) and 4 ms (for example, sTTI #n+8), switched, is configured for the timing for transmitting HARQ-ACK feedback (or for transmitting UL data) in response to a DL signal transmitted in sTTI #n.

In this case, the user terminal applies the TPC command contained in the downlink control information transmitted in this sTTI #n to the uplink transmission power at the same timing as the timing for HARQ-ACK feedback (or for transmitting UL data). For example, when the timing for HARQ-ACK feedback (or for transmitting UL data) is four sTTIs, the user terminal controls the UL transmission power in sTTI #n+4 based on the TPC command contained in the downlink control information transmitted in this sTTI #n. Meanwhile, when the timing for HARQ-ACK feedback (or for transmitting UL data) is 4 ms, the user terminal controls the UL transmission power in sTTI #n+8 based on the TPC command contained in the downlink control information transmitted in this sTTI #n.

In this way, by controlling the timing to use TPC commands based on the timing of DL HARQ feedback and/or the timing of UL scheduling configured in the user terminal, even if the radio base station commands to switch the value of k, it is still possible to control the user terminal so that TPC commands are reflected on transmission power at timings desired by the radio base station.

Second Example

With a second example of the present invention, examples of controlling transmission power by using TPC commands contained in common control information when shortened processing time is configured will be described below. Also, below, the second example will describe cases where the reference value (k) for shortened processing time is 3 ms, but the present embodiment is not limited to this, and k may be 2 ms or 1 ms, or other values may be used. Note that the timing of HARQ-ACK feedback, the timing of UL scheduling and so forth based on the value of k or sTTIs can be configured based on the contents shown in the first example above.

<Setting of Shortened Processing Time when 1-Ms TTI is Used>

When shortened processing time is configured in a user terminal and TPC commands are contained in common control information, the user terminal controls UL signal transmission power in transmission time intervals (subframes, sTTIs, etc.) that are located predetermined timings later, based on these TPC commands. For the common control information, for example, downlink control information (for example, DCI format 3/3A) allocated to the common search space of downlink control channels can be used.

Now, (1) a configuration to use power control commands contained in common control information at timings based on existing systems, and (2) a configuration to use the above power control commands at timings based on shortened processing time will be explained below.

(1) Use of Timings of Existing Systems

Figure 6A:
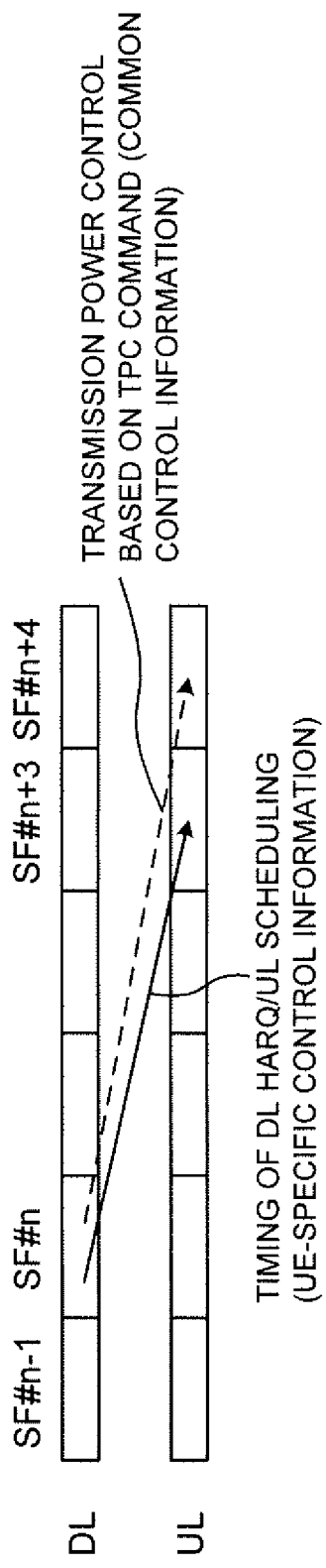
FIGS. 6A and 6B are diagrams to show another example of the method for applying TPC commands.

FIG. 6A shows a case where power control commands contained in downlink control information (common control information) are used to control the transmission power of the PUCCH and/or the PUSCH at existing systems' timings. A user terminal transmits an HARQ-ACK in response to a DL signal (for example, PDSCH) transmitted in SF #n, as feedback, in SF #n+3, which is located k ms later (here, k=3). In addition, the user terminal transmits uplink data (for example, PUSCH) in response to the UL transmission command contained in the downlink control information (UE-specific control information) transmitted in SF #n, as feedback, in SF #n+3, which is located 3 ms later.

Meanwhile, the user terminal uses the TPC command contained in the common control information transmitted in this SF #n to control the UL transmission power in SF #n+4, which is located a timing after SF #n, where this timing is defined based on existing systems (k=4 in FDD).

Note that the user terminal can control the transmission power of the PUCCH and/or the PUSCH to be transmitted as feedback in SF #n+3 based on TPC commands contained in common control information in SF #n or earlier SFs (SF #n−1 or earlier SFs). For example, when common control information to contain a TPC command is transmitted in SF #n−1, the user terminal controls the transmission power of the PUCCH and/or the PUSCH in SF #n+3 based on the TPC command contained in this common control information.

In this way, referring to FIG. 6A, TPC commands are used at timings that are the same as in existing systems, regardless of the configuration of shortened processing time, so that it is possible to reserve the time required to control transmission power and/or to calculate power headroom report (PHR) information related to transmission power, in the user terminal. By this means, it is possible to reduce the increase of the load incurred by transmission power control in the user terminal, so that it is possible to configure communication based on shortened processing time, even when the user terminal has low capabilities regarding transmission power control.

Note that, when a user terminal that controls the transmission power of the PUCCH and/or the PUSCH by using TPC commands contained in common control information also controls transmission power by using, at the same time, TPC commands that are contained in control information (DCI) for scheduling the PDSCH and/or the PUSCH, cases might arise where these TPC commands are used at different timings. Therefore, in a given PUCCH/PUSCH-transmitting subframe, both a TPC command contained in common control information received in one subframe and a TPC command contained in control information for scheduling the PUCCH and/or the PUSCH received in another subframe may be used at overlapping timings.

In this case, a user terminal may sum up the values of both TPC commands and apply this to transmission power, apply only the TPC command contained in the PUCCH and/or PUSCH-scheduling control information, or apply only the TPC command contained in the common control information. Which TPC command is used preferentially may be determined in advance in the specification, or the order of the priorities of TPC commands to be applied may be reported from the radio base station to the user terminal. By allowing the radio base station and the user terminal to share a common understanding as to which TPC commands are to be prioritized, proper transmission power control can be implemented.

(2) Use of Timings Based on Shortened Processing Time

Figure 6B:
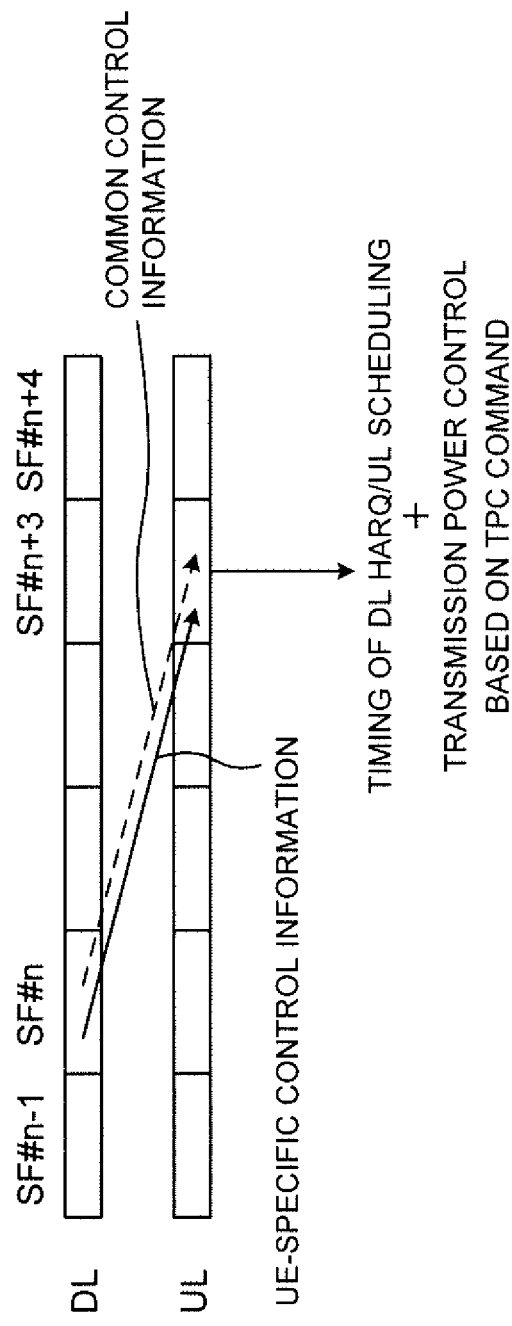

FIG. 6B shows a case where power control commands contained in downlink control information (common control information) are used to control the transmission power of the PUCCH and/or the PUSCH at timings based on shortened processing time. A user terminal transmits an HARQ-ACK in response to a DL signal (for example, PDSCH) transmitted in SF #n, as feedback, in SF #n+3, which is located k ms later (here, k=3). In addition, the user terminal transmits uplink data (for example, PUSCH) in response to the UL transmission command contained in the downlink control information (DCI) transmitted in SF #n, as feedback, in SF #n+3, which is located k ms later.

Also, the user terminal uses the TPC command contained in the common control information transmitted in this SF #n to control the UL transmission power in SF #n+3, which is located a timing after SF #n, where this timing is defined based on shortened processing time (here, k=3).

In this way, in FIG. 6B, when the shortened processing time is configured, TPC commands contained in common control information are applied to UL signal transmission power control at the same timing as this shortened processing time. By this means, shortened transmission power control (fast power adaptation) to suit the shortened processing time can be implemented. As a result of this, when a UL signal is transmitted based on shortened processing time, unlike in existing systems, it is possible to control the transmission power of this UL signal by using the latest (closest) transmission power control command.

(Variations)

Note that the timing for applying TPC commands contained in common control information and the timing for applying TPC commands contained in UE-specific control information may be configured together, or may be configured separately. For example, TPC commands contained in common control information and TPC commands contained in UE-specific control information may be both used at timings that are the same timings as in existing systems, or at timings based on shortened processing time. Alternatively, TPC commands contained in common control information may be used at the same timings as in existing systems, and TPC commands contained in UE-specific control information may be used at timings based on shortened processing time. Alternatively, TPC commands contained in UE-specific control information may be used at the same timings as in existing systems, TPC commands contained in common control information may be used at timings based on shortened processing time.

<Setting of Shortened Processing Time when Shortened TTI is Used>

When shortened processing time by means of shortened sTTIs is configured, a user terminal can control the transmission power of the sPUCCH and/or sPUSCH transmitted in sTTIs depending on whether or not TPC commands in common control information (for example, DCI format 3/3A) are supported.

If common control information (DCI format 3/3A) does not support application to the sPUCCH and the sPUSCH transmitted in sTTIs, the common control information may be applied to the PUCCH and/or PUSCH transmitted in normal TTIs. In this case, TPC commands contained in the common control information can be applied to the PUCCH and/or the PUSCH at existing systems' timings. Alternatively, TPC commands contained in the common control information can be applied to the PUCCH and/or the PUSCH at timings based on shortened processing time.

When common control information (DCI format 3/3A) supports application to the sPUCCH and the sPUSCH transmitted in sTTIs, the transmission power of the sPUCCH and/or the sPUSCH that are located predetermined timings later can be controlled by using TPC commands contained in common control information. For example, a user terminal can control the transmission power of the sPUCCH and/or the sPUSCH transmitted at the same timing as the timing of DL HARQ feedback and/or the timing of UL scheduling based on power control commands contained in common control information.

Alternatively, the user terminal can control the transmission power of the sPUCCH and/or the sPUSCH transmitted at timings that are the same as in existing systems (for example, 4 ms later) based on power control commands contained in common control information.

Third Example

With a third example of the present invention, transmission power control for when a plurality of sTTIs (for sPUSCH and/or sPUCCH transmission) are included in one subframe (1-ms TTI) will be described.

When receiving a plurality of TPC commands in a predetermined period, a user terminal can accumulate the results of these TPC commands and control transmission power. Whether TPC commands are stored in the user terminal or not can be configured by higher layer signaling. As for the method of accumulating TPC commands, the method of accumulating TPC commands within a subframe and across subframes (method 1), and the method of accumulating TPC commands across subframe, without accumulating TPC commands within a subframe (method 2), can be used.

(Method 1)

When the configuration for accumulating TPC commands is commanded in higher layer signaling, a user terminal can control the accumulation TPC commands in one subframe and over a plurality of subframes. That is, the user terminal can control transmission power by accumulating TPC commands transmitted in each sTTI not only within a subframe but also between subframes. By this means, the user terminal can control transmission power by taking into account the TPC command transmitted in each sTTI. Furthermore, the user terminal can raise or lower the transmission power quickly.

In the event the configuration for not accumulating TPC commands is given in higher layer signaling, the user terminal determines the correction value to apply to transmission power control based on TPC commands transmitted within one subframe, and controls transmission power accordingly. When a plurality of TPC commands are transmitted from the radio base station in a plurality of sTTIs contained in one subframe, the user terminal can control transmission power based on a predetermined sTTI (for example, the TPC command that is transmitted first).

(Method 2)

When the configuration for accumulating TPC commands is commanded in higher layer signaling, a user terminal, when controlling transmission power in a given subframe, determines the correction value for use in transmission power control based on a predetermined TPC command transmitted in this subframe, and controls transmission power accordingly. When a plurality of TPC commands are transmitted from the radio base station in a plurality of sTTIs contained in one subframe, the user terminal can control transmission power based on a predetermined sTTI (for example, the TPC command that is transmitted first). Meanwhile, the user terminal accumulates the TPC command used in each subframe, over a plurality of subframes. This eliminates the need for calculating transmission power by taking into account all of the TPC commands transmitted in each sTTI, so that it is possible to reduce the load on the user terminal incurred by calculation of transmission power. In addition, since transmission power (or transmission power density) can be stabilized within a subframe, it is possible to reduce interference of other cells.

In the event the configuration for not accumulating TPC commands is commanded by higher layer signaling, the user terminal determines the correction value to apply to transmission power control based on TPC commands transmitted in one subframe, and controls transmission power. When a plurality of TPC commands are transmitted from the radio base station in a plurality of sTTIs contained in one subframe, the user terminal can control transmission power based on a predetermined sTTI (for example, the TPC command that is transmitted first).

(Radio Communication System)

Now, the structure of a radio communication system according to the present embodiment will be described below. In this radio communication system, the radio communication methods according to the above-described embodiments are employed. Note that the radio communication method according to each embodiment described above may be used alone or may be used in combination.

Figure 7:
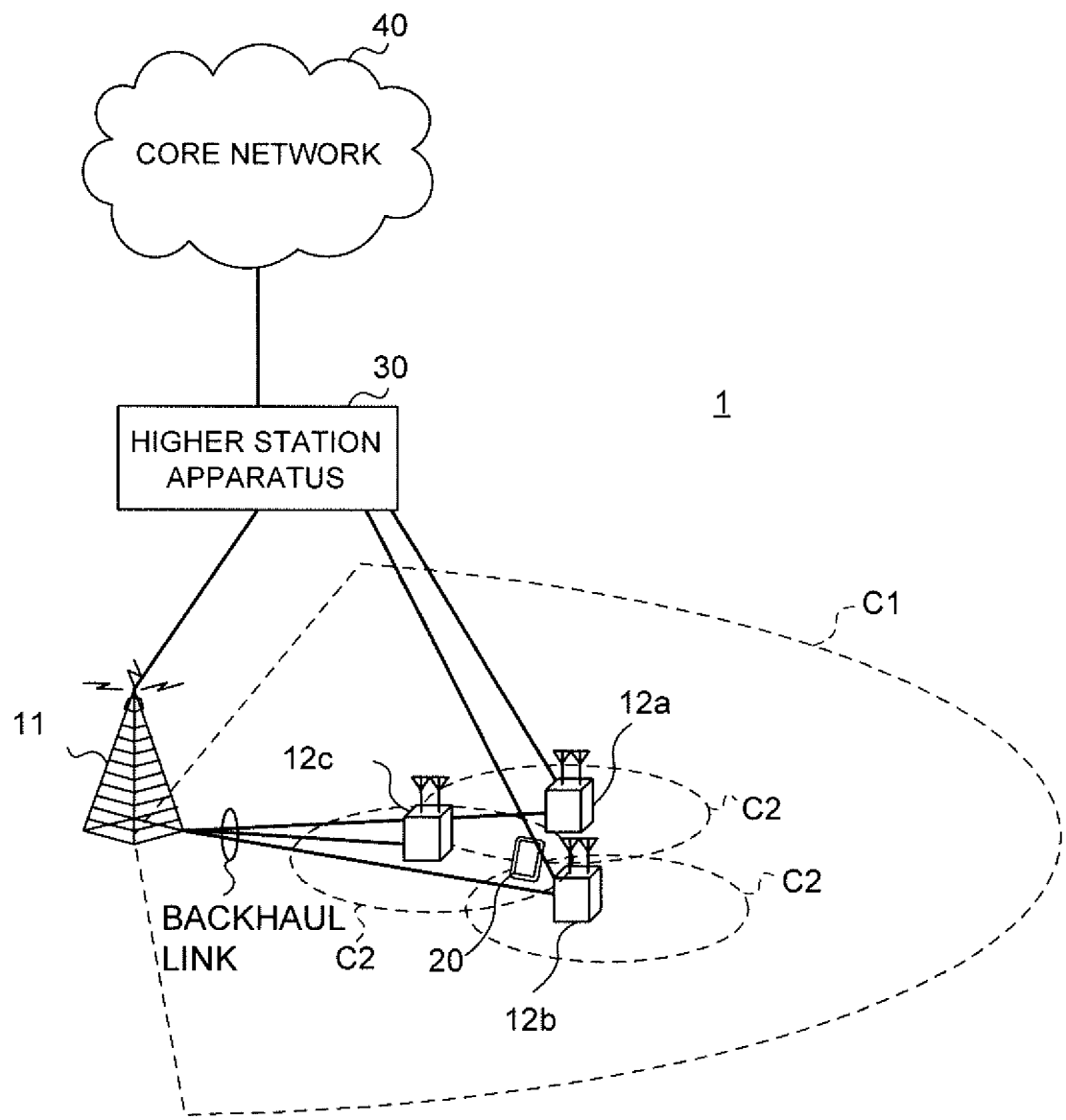
FIG. 7 is a diagram to show an exemplary schematic structure of a radio communication system according to the present embodiment.

FIG. 7 is a diagram to show an exemplary schematic structure of a radio communication system according to the present embodiment. A radio communication system 1 can adopt carrier aggregation (CA), which groups a number of fundamental frequency blocks (component carriers (CCs)) into one, using LTE system bandwidth (for example, 20 MHz) as one unit, and/or dual connectivity (DC), which uses a plurality of cell groups (CGs) that each accommodate one or more CCs. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 shown in FIG. 7 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted here.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate based on time division duplexing (TDD) or frequency division duplexing (FDD) in each cell. A TDD cell and an FDD cell may be referred to as a "TDD carrier (frame structure type 2)" and an "FDD carrier (frame structure type 1)," respectively.

Furthermore, in each cell (carrier), a single numerology may be employed, or a plurality of different numerologies may be employed. As used herein, "numerology" refers to frequency-domain and time-domain parameters, such as subcarrier spacing, symbol duration, cyclic prefix duration, subframe duration and so on.

Between the user terminals 20 and the radio base station 11, communication can be carried out using a carrier of a relatively low frequency band (for example, 2 GHz) and a narrow bandwidth (referred to as, for example, an "existing carrier," a "legacy carrier," and/or the like). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in the UL.

DL channels that are used in the radio communication system 1 include a DL shared channel that is shared by each user terminal 20 (also referred to as "PDSCH (Physical Downlink Shared CHannel)," "DL data channel" and so forth), a broadcast channel (PBCH (Physical Broadcast CHannel)), L1/L2 control channels and so on. User data, higher layer control information, SIBs (System Information Blocks) and so forth are communicated in the PDSCH. Also, the MIB (Master Information Block) is communicated in the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. Retransmission control information (for example, at least one of A/N, NDI, HPN, and redundancy version (RV)) pertaining to UL signals (for example, PUSCH) can be communicated using at least one of the PHICH, the PDCCH, and the EPDCCH.

UL channels that are used in the radio communication system 1 include a UL shared channel that is shared by each user terminal 20 (also referred to as "PUSCH (Physical Uplink Shared CHannel)," "UL data channel" and/or the like), a UL control channel (PUCCH (Physical Uplink Control CHannel)), a random access channel (PRACH (Physical Random Access CHannel)) and so on. User data, higher layer control information and so on are communicated by the PUSCH. Uplink control information (UCI), including at least one of retransmission control information (for example, A/N) for DL signals (for example, PDSCH), channels state information (CSI), and a scheduling request (SR) is communicated in the PUSCH or the PUCCH. By means of the PRACH, random access preambles for establishing connections with cells are communicated.

(Radio Base Station)

Figure 8:
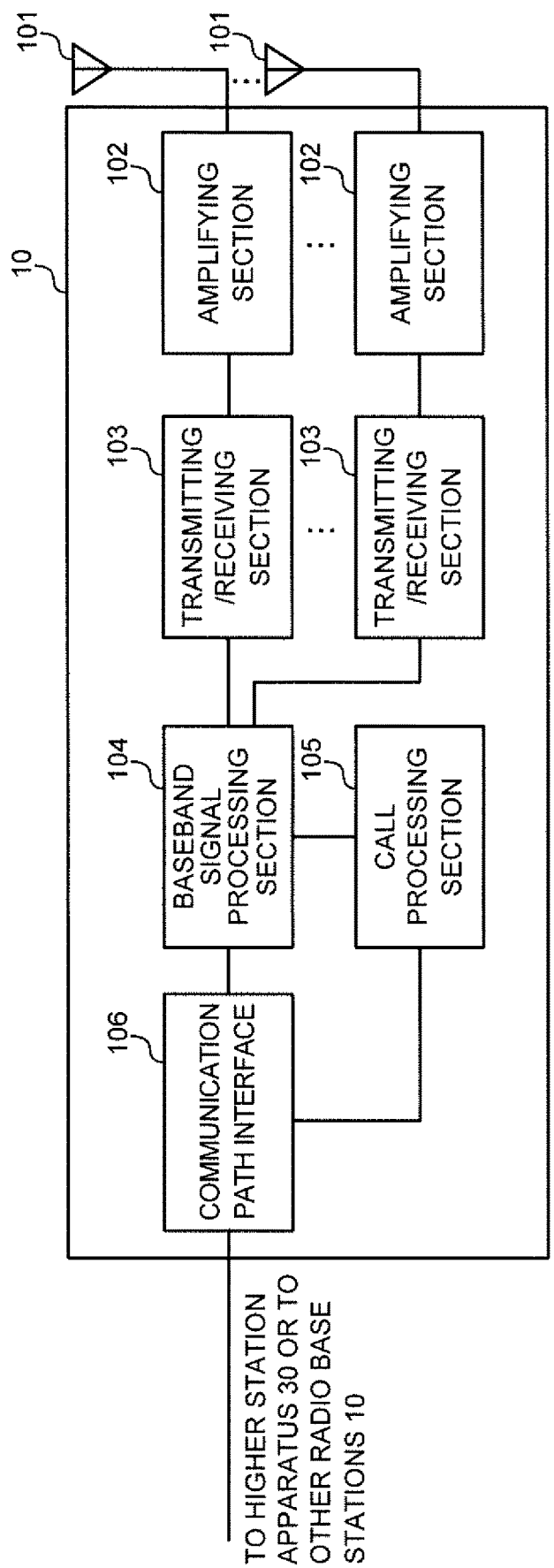
FIG. 8 is a diagram to show an exemplary overall structure of a radio base station according to the present embodiment.

FIG. 8 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

Also, the transmitting/receiving sections 103 transmit downlink control information, including TPC commands to use to control the transmission power of UL signals (for example, PUCCH, PUSCH, sPUCCH, sPUSCH, etc.). In addition, the transmitting/receiving sections 103 receive UCI that includes retransmission control information (for example, A/N) corresponding to the DL shared channel, an uplink shared channel (PUSCH, sPUSCH, etc.) and so forth. In addition, the transmitting/receiving sections 103 may transmit information to indicate the reference value k for transmission timings in the radio base station 10 and/or the user terminal 20, information to indicate the TTI length of sTTIs, and so forth.

Figure 9:
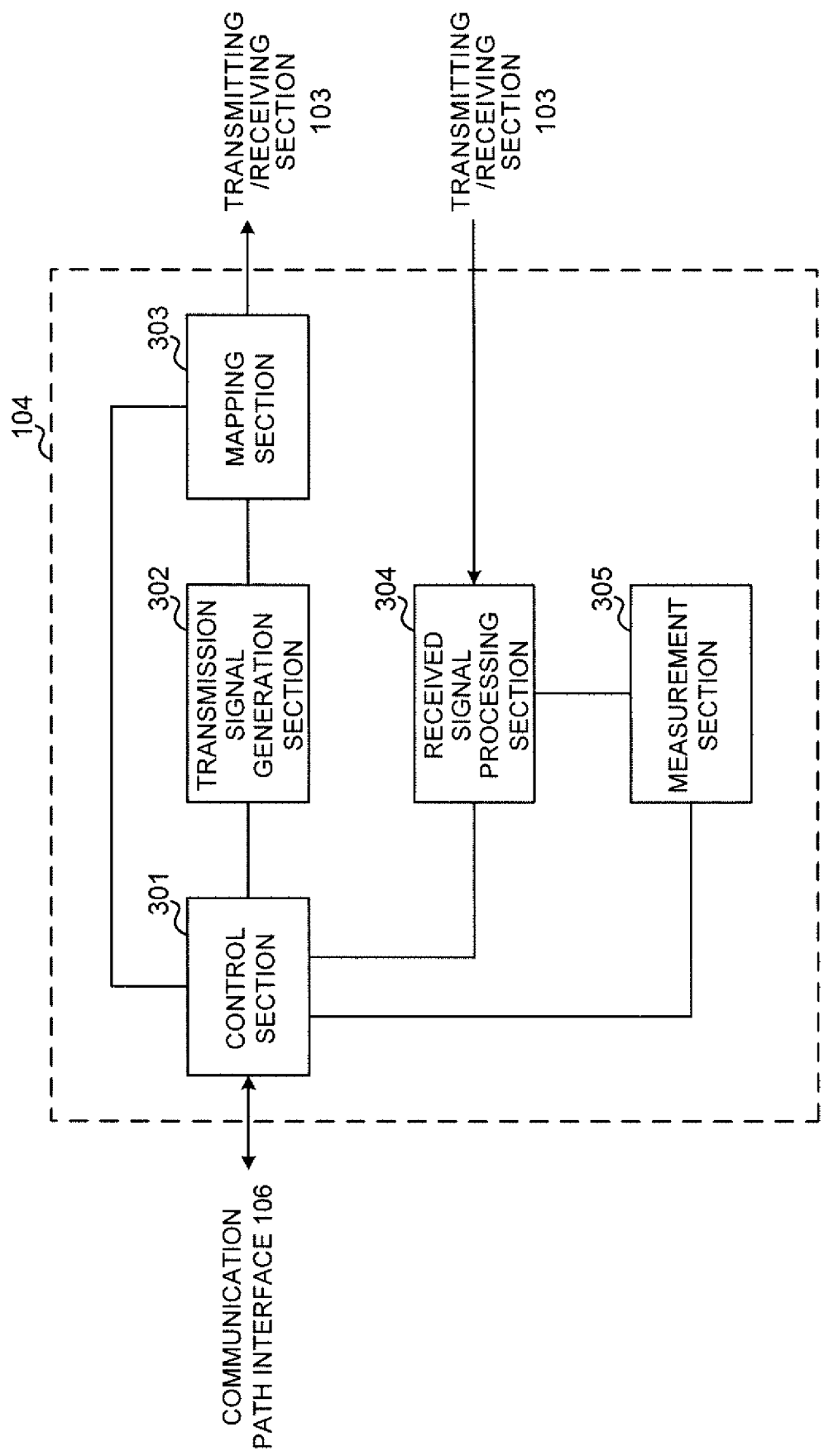
FIG. 9 is a diagram to show an exemplary functional structure of a radio base station according to the present embodiment.

FIG. 9 is a diagram to show an exemplary functional structure of a radio base station according to the present embodiment. Note that, although FIG. 9 primarily shows functional blocks that pertain to characteristic parts of the present embodiment, the radio base station 10 has other functional blocks that are necessary for radio communication as well. As shown in FIG. 9, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, receiving processes (for example, demodulation) for UL signals in the received signal processing section 304, and measurements in the measurement section 305.

To be more specific, the control section 301 performs scheduling for user terminals 20. For example, the control section 301 schedules the PUSCH and/or the PDSCH for the user terminals 20.

Furthermore, the control section 301 may also control the reference value k and the TTI length of sTTIs in the radio base station 10 and/or the user terminals 20, and control the receipt of A/Ns, UL data and so forth at timings (subframes, sTTIs, etc.) determined based on the reference value k and the TTI length of sTTIs.

The control section 301 can be constituted by a controller, a control circuit or control apparatus that can be described based on general understanding of the technical field to which the present invention pertains.

Based on commands from the control section 301, the transmission signal generation section 302 generates DL signals (including DL data, DCI, UL data retransmission control information, higher layer control information and so on), and outputs these DL signals to the mapping section 303.

The transmission signal generation section 302 can be constituted by a signal generator, a signal generating circuit or signal generating apparatus that can be described based on general understanding of the technical field to which the present invention pertains.

Based on commands from the control section 301, the mapping section 303 maps the DL signals generated in the transmission signal generation section 302 (for example, DL data, DCI, UL data retransmission control information, higher layer control information and so on) to predetermined radio resources, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and/or other processes) on UL signals (for example, UL data, UCI and so forth) transmitted from the user terminals 20. To be more specific, the received signal processing section 304 performs receiving processes on UL signals based on the numerology configured in the user terminals 20. To be more specific, the received signal processing section 304 may output the received signals and/or the signals after receiving processes to the measurement section 305. In addition, the received signal processing section 304 performs receiving processes on A/Ns in response to DL signals, and outputs ACKs or NACKs to the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure UL channel quality based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

Figure 10:
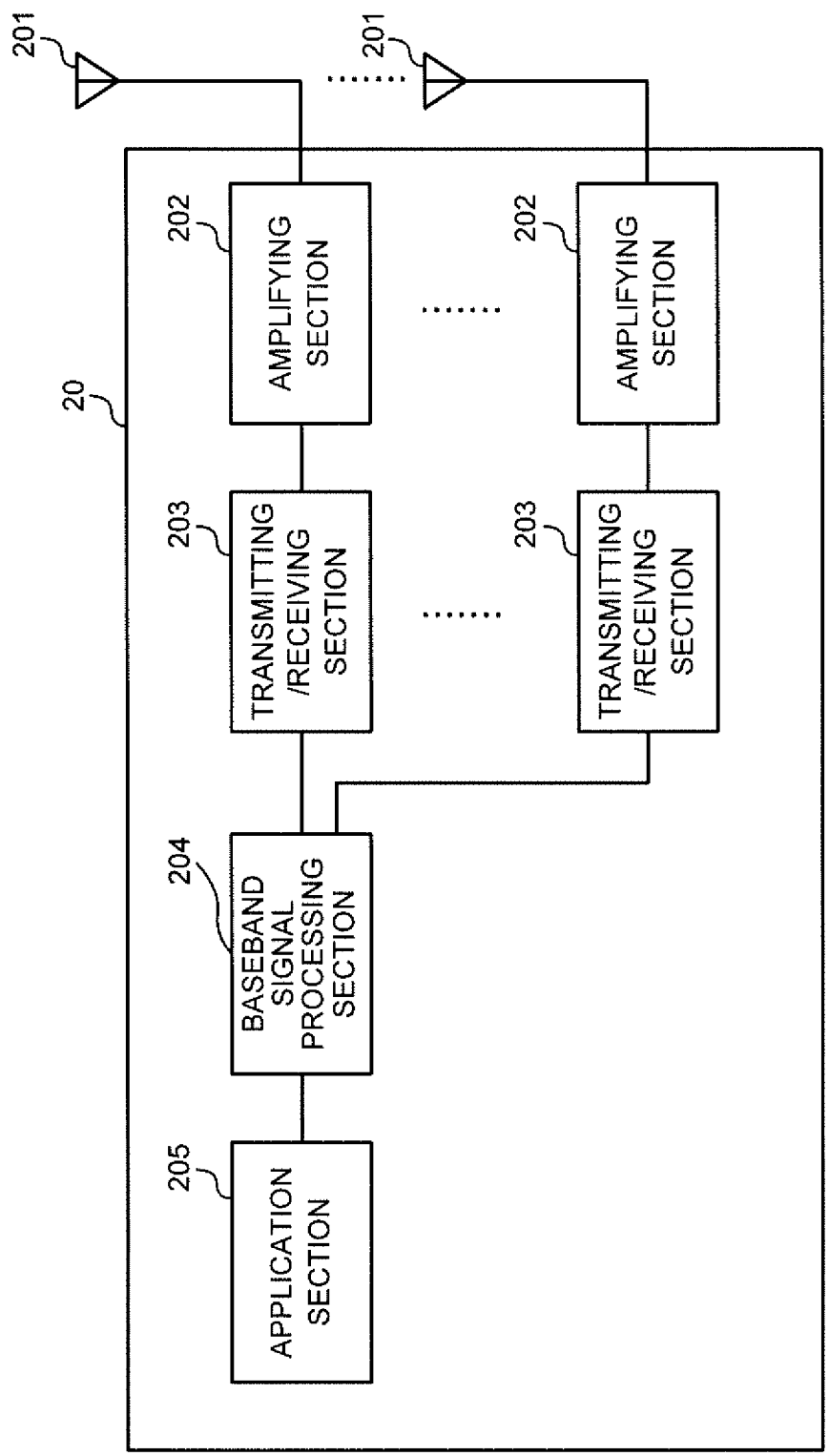
FIG. 10 is a diagram to show an exemplary overall structure of a user terminal according to the present embodiment.

FIG. 10 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in multiple transmitting/receiving antennas 201 are amplified in the amplifying sections 202. The transmitting/receiving sections 203 receive DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to at least one of an FFT process, error correction decoding, a retransmission control receiving process and so on. The DL data is forwarded to the application section 205. The application section 205 performs processes related to higher layers above the physical layer and the MAC layer. Also, the broadcast information is also forwarded to application section 205.

Meanwhile, UL data is input from the application section 205 to the baseband signal processing section 204. The baseband signal processing section 204 performs transmission processes for retransmission control (for example, an HARQ transmission process), channel coding, rate matching, puncturing, a discrete Fourier transform (DFT) process, an IFFT process and so on, and the result is forwarded to each transmitting/receiving section 203. UCI (for example, at least one of DL retransmission control information, CSI and an SR) is also subjected to channel coding, rate matching, puncturing, a DFT process, an IFFT process and so on, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 also receive downlink control information, including TPC commands to use to control the transmission power of UL signals (for example, PUCCH, PUSCH, sPUCCH, sPUSCH, etc.). In addition, the transmitting/receiving sections 203 transmit UCI that includes retransmission control information (for example, A/N) corresponding to the DL shared channel, an uplink shared channel (PUSCH, sPUSCH, etc.) and so forth. In addition, the transmitting/receiving sections 203 may receive information to indicate the reference value k for transmission timings in the radio base station 10 and/or the user terminal 20, information to indicate the TTI length of sTTIs, and so forth.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 11:
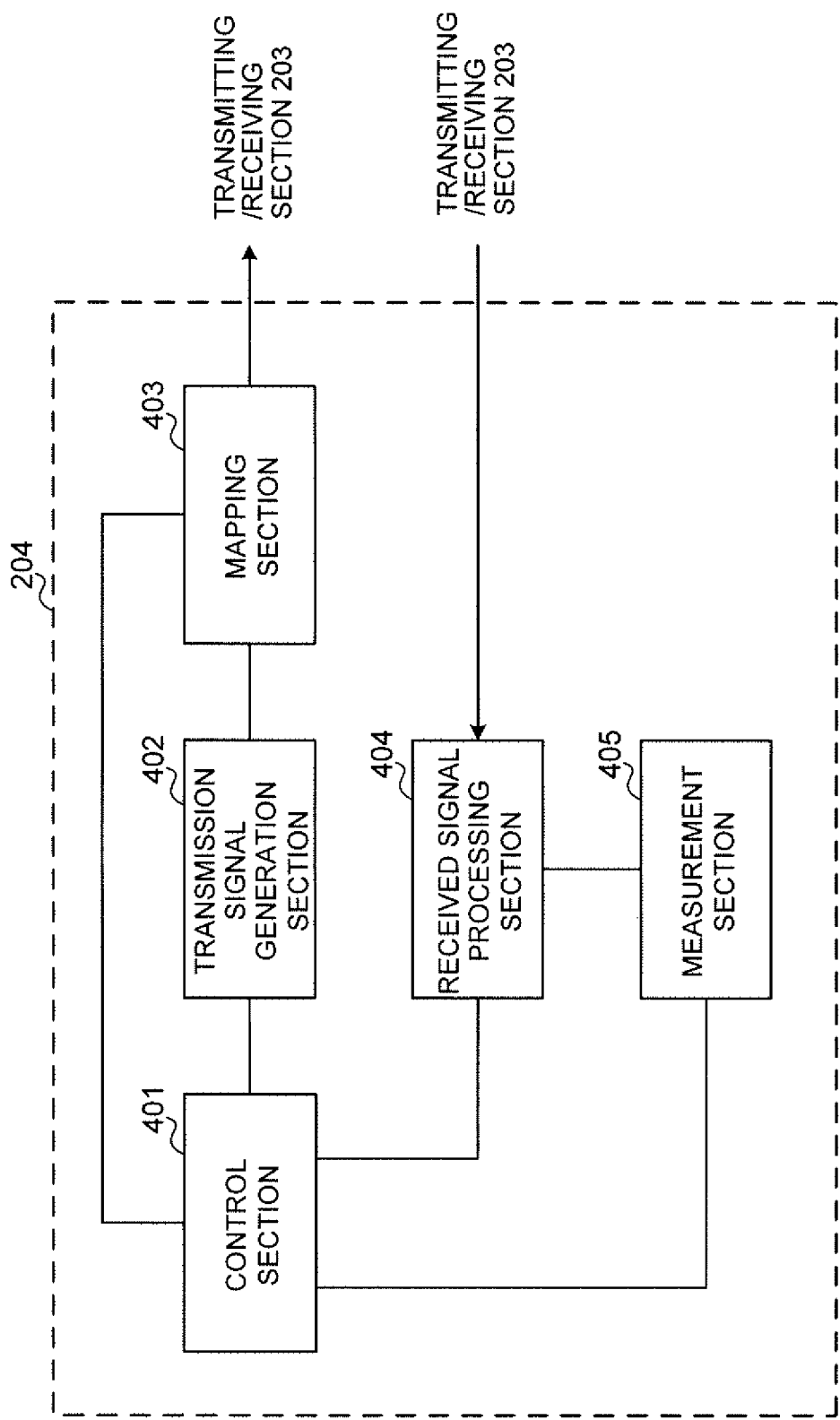
FIG. 11 is a diagram to show an exemplary functional structure of a user terminal according to the present embodiment.

FIG. 11 is a diagram to show an exemplary functional structure of a user terminal according to the present embodiment. Note that, although FIG. 11 primarily shows functional blocks that pertain to characteristic parts of the present embodiment, the user terminal 20 has other functional blocks that are necessary for radio communication as well. As shown in FIG. 11, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

To be more specific, the control section 401 controls the transmission power of a UL signal based on a power control command contained in downlink control information that is transmitted in a predetermined transmission time interval (SF and/or sTTI) in which a DL signal is transmitted, or in a transmission time interval located before the predetermined transmission time interval. For example, the control section 401 controls a UL signal in response to a DL signal received in a predetermined transmission time interval to be transmitted in a first transmission time interval, which is located a first period after the predetermined transmission time interval, and controls the transmission power of a UL signal that is transmitted in a second transmission time interval, which is located a second period after the predetermined transmission time interval, where the second period is longer than the first period, based on a power control command contained in the DL signal received in the predetermined transmission time interval (see FIG. 3A and FIG. 4A).

Alternatively, the control section 401 controls a UL signal in response to a DL signal, received in a predetermined transmission time interval, to be transmitted in a first transmission time interval, which is located a first period after the predetermined transmission time interval, and controls the transmission power of the UL signal to be transmitted in the first transmission time interval based on a power control command contained in the DL signal received in the predetermined transmission time interval (see FIGS. 3B and 3C, FIG. 4B and FIG. 5).

Alternatively, when shortened TTIs of different TTI lengths are configured in the DL and the UL, the control section 401 controls transmission power by applying a power control command, contained in a DL signal received in a predetermined transmission time interval, to a plurality of UL signals, which are transmitted at different transmission timings depending on DL signals received in the predetermined transmission time interval (see FIG. 4C).

In addition, the control section 401 can accumulate power control commands within a subframe containing a plurality of shortened TTIs, and/or across subframes.

The control section 401 can be constituted by a controller, a control circuit or control apparatus that can be described based on general understanding of the technical field to which the present invention pertains.

The transmission signal generation section 402 generates UL signals (including UL data, UCI, UL reference signals and so forth) as commanded from the control section 401 (the generation collectively referring to, for example, performing processes such as encoding, rate matching, puncturing, modulation, and/or other processes), and outputs these to the mapping section 403. The transmission signal generation section 402 can be constituted by a signal generator, a signal generating circuit or signal generating apparatus that can be described based on general understanding of the technical field to which the present invention pertains.

The mapping section 403 maps the UL signals generated in the transmission signal generation section 402 to radio resources, as commanded from the control section 401, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so forth) for DL signals (DL data, DCI, higher layer control information, and so on). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CRS and/or CSI-RS) from the radio base station 10, and outputs the measurement results to the control section 401.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 12:
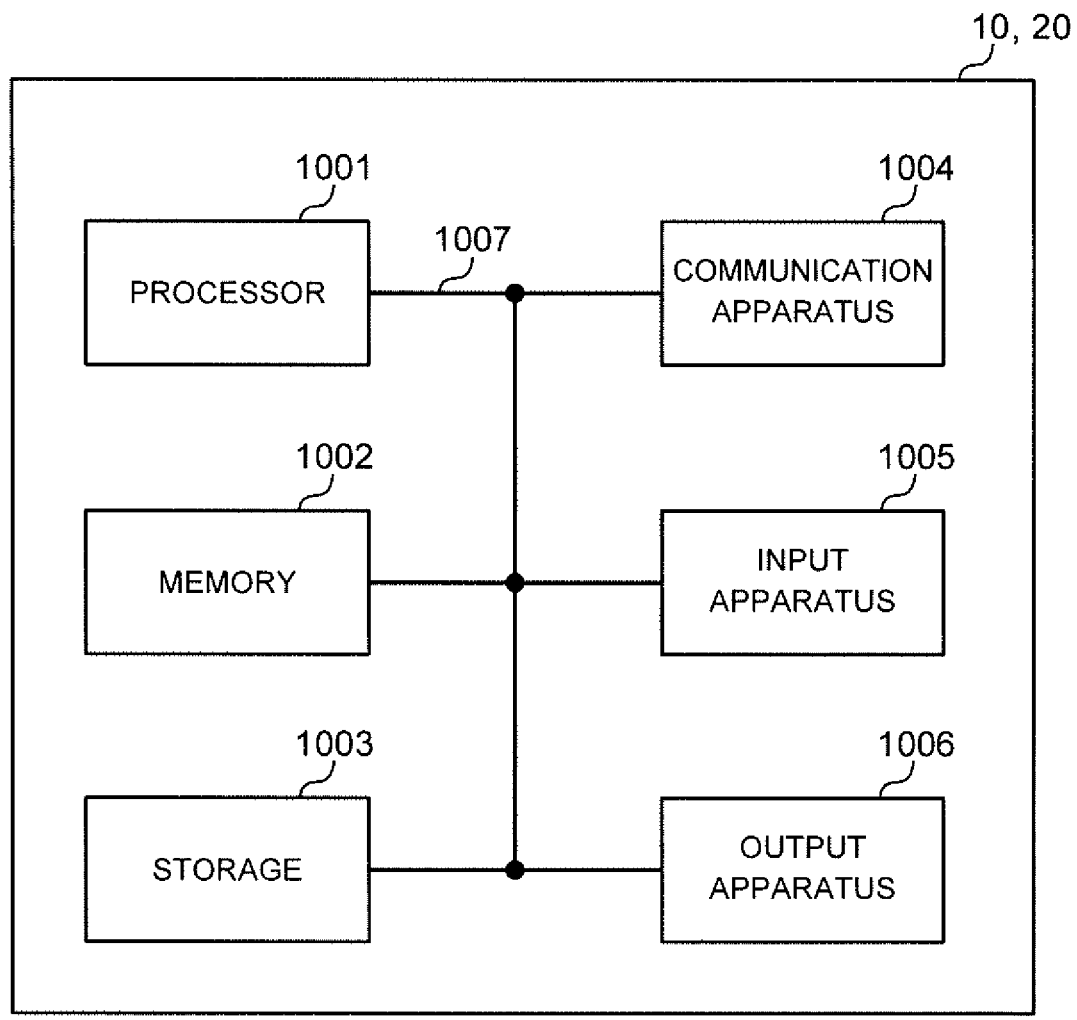
FIG. 12 is a diagram to show an exemplary hardware structure of a radio base station and a user terminal according to the present embodiment.

That is, a radio base station, a user terminal and so on according to an embodiment of the present invention may function as a computer that executes the processes of the radio communication method of the present invention. FIG. 12 is a diagram to show an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit to use when communicating signals. A radio frame, a subframe, a slot and a symbol may be each called by other equivalent names. For example, one subframe may be referred to as a "transmission time interval (TTI)," or a plurality of consecutive subframes may be referred to as a "TTI," or one slot may be referred to as a "TTI." That is, a subframe and a TTI may be a subframe (1 ms) in existing LTE, may be a shorter period than ms (for example, one to thirteen symbols), or may be a longer period of time than 1 ms. Note that the unit to represent a TTI may be referred to as a "slot," a "minislot," a "scheduling unit" and so on, instead of a "subframe."

Here, a TTI refers to the minimum time unit of scheduling in radio communication, for example. For example, in LTE systems, a radio base station schedules the allocation of radio resources (such as the frequency bandwidth and/or the transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time length of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on. Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI long. One TTI and one subframe may be each comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, symbols and so on described above are merely examples. For example, configurations such as the number of subframes included in a radio frame, the number of slots included in a subframe, the number of symbols and RBs included in a slot, the number of subcarriers included in an RB, the number of symbols in a TTI, the duration of symbols and the duration of cyclic prefixes (CPs) can be changed in a variety of ways.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB,"

"eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a structure in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and/or optical regions (both visible and invisible).

When terms such as "include," "comprise" and other variations of these terms are used in this specification or in claims, such terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-179895, filed on Sep. 14, 2016, including the specification, drawings and abstract, is incorporated herein by reference in its entirety.

The invention claimed is:

1. A terminal comprising:
a receiver that receives a TPC command for determining transmission power of an uplink shared channel;
a transmitter that transmits the uplink shared channel; and
a processor that controls accumulation of TPC commands that are received using a time domain that is shorter than one subframe,
wherein whether or not the TPC commands are accumulated is configured by higher layer signaling,
wherein if the TPC commands are accumulated, the processor controls determination of the transmission power of the uplink shared channel based on a sum of TPC commands, which are received using the time domain that is shorter than one subframe,
wherein if the TPC commands are not accumulated, the processor determines an adjustment value for the TPC commands, which are received using the time domain that is shorter than one subframe, and
wherein the TPC commands are in a given period that is determined in symbols.

2. A radio communication method for a terminal, comprising:
receiving a TPC command for determining transmission power of an uplink shared channel;
transmitting the uplink shared channel; and
controlling accumulation of TPC commands that are received using a time domain that is shorter than one subframe,
wherein whether or not the TPC commands are accumulated is configured by higher layer signaling,
wherein if the TPC commands are accumulated, the method further comprises controlling determination of the transmission power of the uplink shared channel based on a sum of TPC commands, which are received using the time domain that is shorter than one subframe,
wherein if the TPC commands are not accumulated, the terminal determines an adjustment value for the TPC commands, which are received using the time domain that is shorter than one subframe, and
wherein the TPC commands are in a given period that is determined in symbols.

3. A base station comprising:
a transmitter that transmits a TPC command for determining transmission power of an uplink shared channel;
a receiver that receives the uplink shared channel; and
a processor that controls accumulation of TPC commands that are transmitted using a time domain that is shorter than one subframe,
wherein whether or not the TPC commands are accumulated is configured by higher layer signaling,
wherein if the TPC commands are accumulated, the processor controls determination of the transmission power of the uplink shared channel based on a sum of TPC commands, which are transmitted using the time domain that is shorter than one subframe,
wherein if the TPC commands are not accumulated, the processor determines an adjustment value for the TPC commands, which are transmitted using the time domain that is shorter than one subframe, and
wherein the TPC commands are in a given period that is determined in symbols.

4. A system comprising a terminal and a base station, wherein:
the terminal comprises:
a receiver of the terminal that receives a TPC command for determining transmission power of an uplink shared channel;
a transmitter of the terminal that transmits the uplink shared channel; and
a processor of the terminal that controls accumulation of TPC commands that are received using a time domain that is shorter than one subframe, and
the base station comprises:
a transmitter of the base station that transmits the TPC command for determining transmission power of the uplink shared channel;
a receiver of the base station that receives the uplink shared channel; and
a processor of the base station that controls accumulation of TPC commands that are transmitted using the time domain that is shorter than one subframe,
wherein whether or not the TPC commands are accumulated is configured by higher layer signaling,
wherein if the TPC commands are accumulated, the processor of the terminal controls determination of the transmission power of the uplink shared channel based on a sum of TPC commands, which are received, by the terminal, using the time domain that is shorter than one subframe,
wherein if the TPC commands are not accumulated, the processor of the terminal determines an adjustment value for the TPC commands, which are transmitted using the time domain that is shorter than one subframe, and
wherein the TPC commands are in a given period that is determined in symbols.

* * * * *